BLAIR & BEATTY.
Horse Rake.

No. 34,558.  Patented March 4, 1862.

Witnesses
M Coombs.
Geo. V. Reed.

Inventors
R. H. Blair
A. W. Beatty
per Munn & Co
attorneys

UNITED STATES PATENT OFFICE.

R. H. BLAIR AND A. W. BEATTY, OF SALTSBURG, PENNSYLVANIA.

IMPROVEMENT IN HORSE-RAKES.

Specification forming part of Letters Patent No. 34,558, dated March 4, 1862.

*To all whom it may concern:*

Be it known that we, R. H. BLAIR and A. W. BEATTY, of Saltsburg, in the county of Indiana and State of Pennsylvania, have invented a new and Improved Horse-Rake; and we do hereby declare that the following is a full, clear, and exact description of the same, reference being had to the annexed drawings, forming part of this specification, in which—

Figure 1:
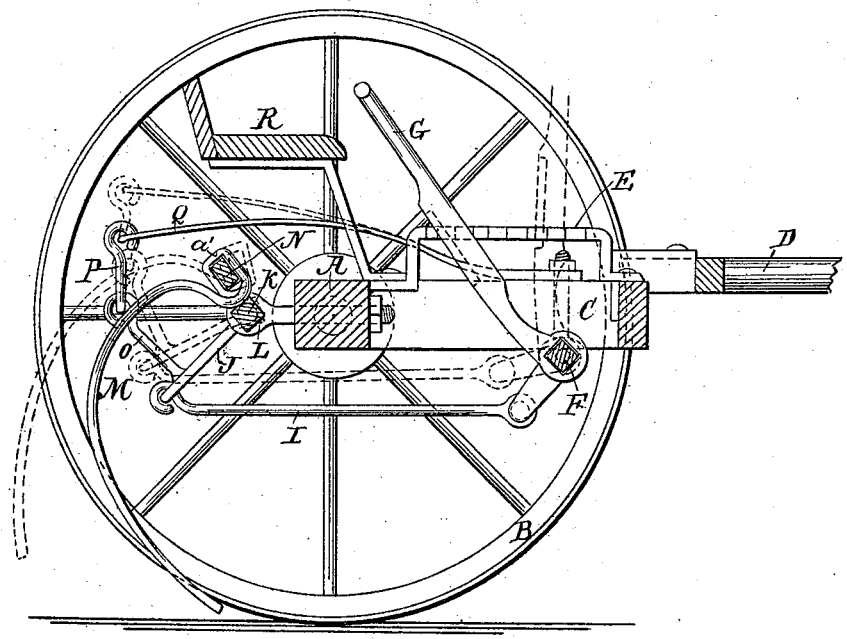
Figure 2:
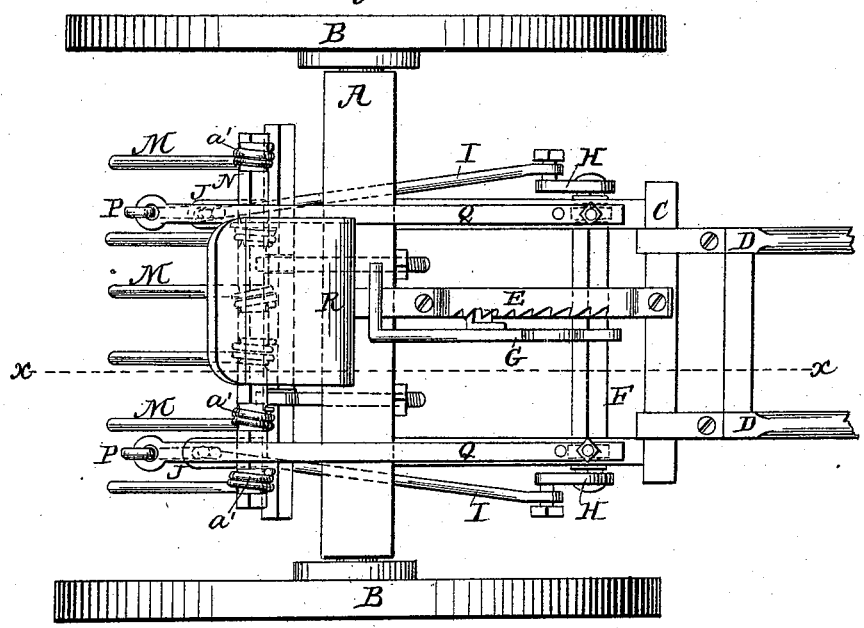

Figure 1 is a side sectional view of our invention, taken in the line $x\ x$ of Fig. 2; and Fig. 2, a plan or top view of the same.

Similar letters of reference indicate corresponding parts in the two figures.

This invention relates to an improved horse-rake of that class in which wire teeth are employed.

The invention consists in the peculiar arrangement of the rake-head, its connection with springs, and an adjusting-lever, substantially as hereinafter fully shown and described, whereby the manipulation of the rake is rendered extremely simple and the device placed under the complete control of the operator.

To enable those skilled in the art to fully understand and construct our invention, we will proceed to describe it.

A represents an axle, on each end of which a wheel, B, is placed loosely, and C is a frame which is attached to the front side of axle A, and has thills D secured to it. On the frame C there is placed a rack-plate, E, and at the under side of said frame there is secured a shaft, F, to which a lever, G, is attached, said lever extending up by the side of the rack-plate E. At each end of shaft F there is a crank, H. These cranks have each a connecting-rod, I, attached, and the back ends of the rods are secured to arms J J, which project from a shaft or bar, K, said shaft or bar being fitted in eyes or bearings L, which are in the back of the axle A. The bar K is allowed to turn freely in the eyes or bearings L.

M represents wire rake-teeth, which are curved in the usual form, and have their upper ends fitted in the bar K. The teeth M are placed at the proper distance apart, and are coiled around a bar, N, which is quite close to the bar K. The coils $a$ around the bar N give elasticity to the teeth M, allowing them to readily give or yield to any obstructions which may lie in their path. Each arm J of the shaft or bar K has a rod, O, attached to it, and these rods are connected by links P to springs Q, said springs being secured by bolts $a'$ to the upper surface of the frame C. The springs Q have a tendency to keep the rake-teeth elevated above the surface of the ground, as shown in red outline in Fig. 1. By drawing back the lever G and securing it in the plate E the teeth M may be secured down in a working position, as shown in dark color or shade in Fig. 1. The lever G is in close proximity to the driver's seat R, and when it is necessary to discharge the load of the rake the driver simply releases the lever G from the rack-plate E, and the springs Q will throw up the teeth M. The manipulation required in operating the rake is therefore extremely simple, and by the arrangement the rake is quickly elevated, the action of the springs insuring a quick discharge of the load, so that the same will be deposited in a compact pile, much more compact than when the rake is elevated by hand.

By having the hay raked in compact piles or windrows the subsequent labor of "cocking" is greatly facilitated and the work done in a much more perfect manner than usual.

We would remark that the rake-teeth may be provided with the ordinary or any proper clearer.

We do not claim the wire spring-teeth M, coiled around a bar, N, and attached to a bar, K, for such device is old and well known; but We do claim as new and desire to secure by Letters Patent—

The connecting of the bar K of the rake to springs Q Q through the medium of the arms J J, rods O, and links P, in connection with the rods I I, crank-shaft F, lever G, and rack-plate E, all arranged and mounted as shown, to operate as and for the purpose set forth.

R. H. BLAIR.
A. W. BEATTY.

Witnesses:
JOHN WALTER,
JAMES R. MONROE.